United States Patent [19]

Guptill

[11] 3,870,780

[45] Mar. 11, 1975

[54] PURIFICATION OF SODIUM CARBONATE

[75] Inventor: Joel P. Guptill, Syracuse, N.Y.

[73] Assignee: Allied Chemical Corporation, New York, N.Y.

[22] Filed: Sept. 14, 1972

[21] Appl. No.: 289,032

[52] U.S. Cl................ 423/206, 423/184, 423/421
[51] Int. Cl................................................. C01d 7/22
[58] Field of Search .......... 423/184, 206, 207, 208, 423/421, 425, 426, 427

[56] References Cited
UNITED STATES PATENTS

| | | | |
|---|---|---|---|
| 1,860,781 | 5/1932 | Liebknecht | 423/326 X |
| 1,964,161 | 6/1934 | Kuhnert | 423/184 |
| 1,992,532 | 2/1935 | Kuhnert | 423/422 X |
| 2,143,069 | 1/1939 | Hill et al. | 423/184 |
| 3,131,996 | 5/1964 | Seglin et al. | 423/206 |
| 3,172,726 | 3/1965 | Burke, Jr. et al. | 423/339 |
| 3,479,133 | 11/1969 | Warzel | 423/184 |
| 3,479,134 | 11/1969 | Warzel | 423/427 |

Primary Examiner—O. R. Vertiz
Assistant Examiner—Cary P. Straub
Attorney, Agent, or Firm—Gerard P. Rooney; Ralph F. Manning

[57] ABSTRACT

A method of treating an aqueous solution of sodium carbonate containing soluble silicates and suspended insoluble matter by digesting the solution at a temperature within the range of about 185° to 220°F. for a time sufficent to substantially reduce the soluble silicates contained therein, separating the solution from the insoluble matter, and obtaining purified sodium carbonate by crystallization. The method is particularly applicable to the treatment of solutions of calcined trona.

11 Claims, No Drawings

PURIFICATION OF SODIUM CARBONATE

CROSS-REFERENCE TO RELATED APPLICATION

Co-filed U.S. patent application, "Two Stage Calcination Process for Production of Sodium Carbonate," U.S. Ser. No. 288,855.

BACKGROUND OF THE INVENTION

I. Field of the Invention

Naturally occurring trona, consisting mainly of sodium sesquicarbonate ($Na_2CO_3 \cdot NaHCO_3 \cdot 2H_2O$), is found in Wyoming and other parts of the world. By calcining this material, crude soda ash (anhydrous sodium carbonate) is obtained.

Soluble silicates are a major impurity in solutions prepared by dissolving decarbonized trona. They ultimately become a substantial impurity in soda ash prepared from the decarbonized trona solutions. It is, therefore, advantageous to remove the soluble silicates from the decarbonized trona liquors and thereby produce a purer soda ash product containing a smaller amount of the soluble silicates.

Soluble organic compounds are also a major impurity in trona. If not removed, they are incorporated into the soda ash produced from the trona. Not only do they constitute an impurity in the product, but they may also adversely modify sodium carbonate monohydrate crystals produced by crystallization from decarbonized trona liquors. Ordinary low temperature calcination procedures do not remove the troublesome organic compounds present in the trona. A key operation associated with the manufacture of high quality soda ash from trona, therefore, involves the elimination of organic impurities which have a detrimental effect on the geometrical and physical properties of the final product.

II. Description of the Prior Art

Two prominent methods for the removal of this organic matter have been employed; one involves treatment of the process solution with activated carbon while the other requires that the ore be exposed to elevated temperatures. The major drawback of the first approach is that not all of the critical organic habit-modifiers respond or adsorb favorably and, therefore, remain in solution causing less than ideal crystals to form. The elevated temperature scheme, on the other hand, not only results in undesirable solubilization of silica by solid phase reaction with soda ash but also involves operational difficulties due to fusion of the ore.

It can be seen then, that these soluble organic compounds may be removed by sorption on activated carbon or by decarbonizing the trona at a temperature which is high enough to oxidize or vaporize the organic compounds. No matter which method is used to remove the soluble organic impurities, it is advantageous to remove the soluble silicate contaminant, in order to produce a substantially pure soda ash product.

Decarbonization of trona at an elevated temperature is a most efficient method of removing the soluble organic impurity. However, the elevated temperatures used cause an increase in the soluble silicate concentration in the solutions prepared from the decarbonized trona as is described in U.S. Pat. No. 3,260,567. If trona is decarbonized at these elevated temperatures, it becomes particularly advantageous to remove the soluble silicate impurity and thereby produce a purer soda ash product from the decarbonized trona solutions.

SUMMARY OF THE INVENTION

I have now found a method of removing the soluble silicate from aqueous solutions prepared from decarbonized trona.

The digestion of the solutions at elevated temperatures within the range of 160° to 240°F. in the presence of suspended insolubles in the decarbonized trona, renders a portion of the soluble silicates insoluble. The now-insoluble silicates are removed with the other insoluble portion of the decarbonized trona. The effectiveness of the digestion step may be increased by introducing a small amount of additional solid.

DESCRIPTION OF THE PREFERRED EMBODIMENT

According to the method of the present invention, the quantity of soluble silicates in an aqueous solution of sodium carbonate, such as a 20 to 35.5 percent solution (weight basis) of calcined trona, or preferably a 25 to 35 percent solution, can be substantially reduced by digesting the solution with contained suspended insoluble matter, preferably with agitation, at a temperature ranging from 160° to 240°F., or preferably, from 185° to 210°F. for a time sufficient to remove at least 25 percent of the soluble silicate contained therein, preferably between 30 minutes and 8.0 hours.

If a small quantity, preferably between 0.1 and 2.5 percent (based on the weight of the $Na_2CO_3$) of a metallic compound selected from a group of certain aluminum compounds, magnesium compounds, or mixtures thereof, the removal of the soluble silicates is achieved more rapidly and efficiently. The quantity of metallic compounds is not critical, but most effective results are generally obtained when it is at least three times the quantity of soluble silica present, expressed as $SiO_2$.

The aluminum compounds may be aluminum oxide, hydrated aluminum oxides, aluminum hydroxide or sodium aluminate. The mineral bauxite, which consists primarily of hydrated aluminum oxide has also been found effective. Either "metallurgical" or "chemical" grade bauxite may be used. Aluminum salts such as aluminum sulfate, aluminum chloride, or aluminum nitrate are also effective but are not preferred.

Among the magnesium salts, magnesium oxide, carbonate, sulfate, chloride and nitrate, are effective, with the first two being preferred. The chlorides, sulfates and nitrates of both aluminum and magnesium impart effectiveness due to the formation of their respective hydrates.

The desilication processes may be applied to decarbonized trona liquors which are formed by solution of the decarbonized trona in water or unsaturated sodium carbonate solutions.

In carrying out the process of the present invention, the decarbonized trona is dissolved in water or an unsaturated solution of sodium carbonate. A quantity of decarbonized trona sufficient to produce an essentially saturated sodium carbonate may be added. The insoluble portion is maintained in suspension by agitation. This operation is referred to as digestion. If desilication greater or more accelerated than the capability of the insolubles present in the decarbonized trona is required, one of the desilicating compounds may be added. The digestion is continued for a period of time dictated by the quantity of soluble silicate present, the rate of desilication desired, and the allowable concentration of soluble silicate in the final solution. The insolubilized silicates are then removed with the other insolubles.

The operating temperature is about 160° to 240°F., preferably between 185° to 210°F. This temperature is maintained by preheating the dissolving solution or water, by the heat generated when decarbonized trona is dissolved, by the heat content of the decarbonized trona, by indirect heating or any combination of these. If desired, the digestion can be conducted at autogenous pressures.

The digestion may be carried out in the same vessel in which the decarbonized trona is dissolved or in a separate vessel. The insoluble portion is then removed by conventional methods leaving behind a sodium carbonate solution substantially free of soluble silicates from which sodium carbonate is then obtained by crystallization. Dry sodium carbonate is obtained by (a) concentrating the solution substantially free of soluble silicates so as to crystallize sodium carbonate, (b) separating the sodium carbonate crystals from the concentrated solution and (c) drying the separated crystals. The concentrated solution substantially free of crystals serves as mother liquor.

The process of this invention will be better understood by reference to the following examples in which all percentages are on a weight basis.

EXAMPLE 1

800 Grams of trona decarbonized by indirect firing at 500°C. (932°F.) are dissolved in 1,500 grams of deionized water which has been preheated to 70°C. (158°F.). The temperature rises to 95°C. (203°F.) and is maintained by heating with an electrical hot plate. The insoluble portion is maintained in suspension by agitation. Samples of liquor are extracted, filtered and analyzed for soluble silicates at timed intervals. Table I shows the results.

Zero time is taken as the instant when the decarbonized trona is added to the water.

Table I

TYPICAL DIGESTION

| Time (hrs) | Soluble Silicate as $SiO_2$ Basis $Na_2CO_3$ parts per million (ppm) |
|---|---|
| 0.25 | 1520 |
| 1.00 | 1190 |
| 2.00 | 990 |
| 3.00 | 670 |
| 4.00 | 440 |
| 5.00 | 320 |
| 6.00 | 340 |

The data presented in Table I illustrate the benefits obtained when the liquor is digested in the presence of the suspended insolubles. Within six hours, the concentration of soluble silicate is reduced by about 1200 ppm or to about one-fifth of the initial value.

DESILICATION OF LIQUORS PREPARED FROM TRONA DECARBONIZED AT A HIGH TEMPERATURE

Trona decarbonized at high temperatures contains more soluble silicate than trona decarbonized at low temperatures; all other factors being the same. Therefore, it becomes particularly advantageous to remove the soluble silicate from solution. This is illustrated by the following example.

EXAMPLE 2

The trona was decarbonized at 500°C. (932°F.) by direct firing. During the direct firing, there was some opportunity for the flame to impinge on at least a portion of the trona, heating it to a temperature substantially higher than the average decarbonizing temperature. In all other respects this experiment is identical to that described in Example 1. The results are presented in Table II.

Table II clearly illustrates the advantage of desilicating trona liquors prepared from trona decarbonized at 500°C. Within seven hours, the soluble silicate concentration has been decreased by 1,200 ppm from 3,150 ppm to 1,950 ppm.

TABLE II

DIGESTION OF DECARBONIZED TRONA LIQUOR AT 95°C. (203°F.)
DECARBONIZATION TEMPERATURE: 500°C. (932°F.)
DECARBONIZATION METHOD: DIRECT FIRING

| Time (hrs) | Soluble Silicate as $SiO_2$ Basis $Na_2CO_3$ (ppm) |
|---|---|
| 0.25 | 3150 |
| 0.50 | 3350 |
| 1.00 | 3600 |
| 2.00 | 3400 |
| 3.00 | 2950 |
| 4.00 | 2700 |
| 5.00 | 2400 |
| 6.00 | 2200 |
| 7.00 | 1950 |

EXAMPLE 3

The experimental procedure used in Example 3 is identical to that of Example 2. The only difference is that the decarbonizing temperature is attained by indirect firing by contacting the trona with the gaseous products of fuel combustion. Since flames do not impinge directly on the trona during decarbonization, the initial concentration of the soluble silicate is less. In spite of this substantially lower soluble silicate concentration, desilication of the liquor by digestion is still very beneficial. This is illustrated in Table III.

Table III

DIGESTION OF DECARBONIZED TRONA LIQUOR
DECARBONIZATION TEMPERATURE: 500°C. (932°F.)
DECARBONIZATION METHOD: INDIRECT FIRING

| Time (hrs.) | Soluble Silicate as $SiO_2$ Basis $Na_2CO_3$ (ppm) |
|---|---|
| 0.25 | 1600 |
| 1.12 | 1100 |
| 2.00 | 830 |
| 3.00 | 660 |
| 4.00 | 550 |
| 5.00 | 460 |

Table III illustrates the advantage of digesting trona decarbonized by indirect firing at a high temperature. In a period of five hours, the soluble silicate is reduced from 1600 ppm to 460 ppm soluble silicate as $SiO_2$ basis $Na_2CO_3$.

Examples 2 and 3 show that desilication of trona liquors prepared from trona decarbonized at high temperatures is beneficial regardless of whether the temperature is achieved by direct or indirect firing. Indirect firing produces a decarbonized trona which is substantially lower in soluble silicate content than trona decarbonized at the same temperature by direct firing. Therefore, to achieve a minimum soluble silicate content, indirect firing is preferred.

DESILICATION OF LIQUORS PREPARED FROM TRONA DECARBONIZED AT A LOW TEMPERATURE

Trona decarbonized at low temperatures contains less soluble silicate than trona decarbonized at higher temperatures. For this reason, it becomes less important to desilicate the trona liquor. However, it is still possible to appreciably decrease the soluble silicate content of the liquor by digestion.

EXAMPLE 4

The trona was decarbonized by direct firing at 170°C. (338°F.). 728 Grams of decarbonized trona are dissolved in 1500 grams of deionized water; a proportion selected to produce a 32.5 percent solution. In all other respects, the experimental procedure is the same as that used in Example 1. The results of the experiment are tabulated in Table IV.

Table IV

DIGESTION OF DECARBONIZED TRONA LIQUOR
DECARBONIZATION TEMPERATURE: 170°C. (338°F.)
DECARBONIZATION METHOD: DIRECT FIRING

| Time (hrs.) | Soluble Silicate as $SiO_2$ Basis $Na_2CO_3$ (ppm) |
|---|---|
| 0.25 | 1270 |
| 0.50 | 1210 |
| 1.00 | 930 |
| 1.75 | 550 |
| 3.00 | 380 |
| 4.00 | 360 |
| 5.00 | 260 |
| 6.00 | 250 |

Table IV shows that when calcining at low temperatures it is advantageous to digest the decarbonized trona liquor in order to decrease the concentration of soluble silicate.

DESILICATION OF LIQUORS PREPARED BY DISSOLVING DECARBONIZED TRONA IN A SODIUM CARBONATE SOLUTION

Liquors formed by the dissolution of decarbonized trona in an unsaturated sodium carbonate solution may also be digested to reduce the soluble silicate.

EXAMPLE V

The experimental procedure is identical to that described in Example 1 with the following exceptions. 485 Grams of trona decarbonized at 500°C. (932°F) by direct firing, are dissolved in 1500 grams of 10 percent sodium carbonate mother liquor from the monohydrate crystallization. This proportion is selected so the final solution will be 32 percent sodium carbonate. The results are shown in Table V.

Table V

DIGESTION OF DECARBONIZED TRONA LIQUOR
FORMED BY SOLUTION OF DECARBONIZED TRONA
IN A 10% SODIUM CARBONATE SOLUTION

| Time (hrs) | Soluble Silicate as $SiO_2$ Basis $Na_2CO_3$ (ppm) |
|---|---|
| 0.25 | 904 |
| 0.50 | 628 |
| 1.00 | 564 |
| 1.75 | 542 |
| 3.00 | 356 |
| 4.00 | 316 |
| 5.00 | 288 |
| 6.00 | 284 |

Table V shows that the desilication by digestion is still effective when the decarbonized trona is dissolved in a sodium carbonate solution.

In commercial operation it may be desirable to dissolve the decarbonized trona in an aqueous medium made up at least partially of mother liquor recycled from the sodium carbonate crystallizer.

EXAMPLE 6

The experimental procedure is identical with that used in Example 5 except the 10% sodium carbonate solution contains soluble silicate at a concentration of 2000 ppm as $SiO_2$ basis $Na_2CO_3$. The results are shown in Table VI.

Table VI

DIGESTION OF DECARBONIZED TRONA LIQUOR FORMED
BY SOLUTION OF DECARBONIZED TRONA IN A 10%
SODIUM CARBONATE SOLUTION CONTAINING 2000 PPM
$SiO_2$ BASIS $Na_2CO_3$

| Time (hrs) | Soluble Silicate as $SiO_2$ Basis $Na_2CO_3$ (ppm) |
|---|---|
| 0.25 | 1180 |
| 0.50 | 1135 |
| 1.00 | 1050 |
| 1.50 | 900 |
| 3.00 | 580 |
| 4.00 | 445 |
| 5.00 | 335 |
| 6.00 | 350 |

It is also evident that the amount of soluble silica initially present is only about half that normally expected. Preparing the solution using mother liquor from the crystallization step as at least part of the aqueous medium is effective in reducing the soluble silicate content of the resulting solution.

DESILICATION WITH CHEMICAL ADDITIVES

Certain chemical additives have been found effective in accelerating the rate of removal of the silicates from solution, namely certain aluminum and magnesium compounds. The aluminum compounds found satisfactory are aluminum hydroxide, sodium aluminate, bauxite and aluminum oxide. Soluble aluminum salts such as aluminum chloride, nitrate, sulfate, etc., are effective but introduce anionic impurities into the system.

The chemical additives may be used regardless of the decarbonization conditions.

SODIUM ALUMINATE

The ability of sodium aluminate to reduce the soluble silicate content is illustrated by the following example.

EXAMPLE 7

The experimental procedure is identical to that used in Example 1 with one exception. After a sample of liquor is separated at 0.25 hours, 11.7 grams of 65 percent reagent grade sodium aluminate is added to the liquor. The decarbonized trona used in Example 7 is the same as used in Example 1. The data shown in Table I can, therefore, be used to compare the effect of sodium aluminate addition with a case in which no addition is made. The results are tabulated in Table VII.

Table VII

DIGESTION OF DECARBONIZED TRONA LIQUOR WITH SODIUM ALUMINATE

| Time (hrs) | Soluble Silicate as $SiO_2$ Basis $Na_2CO_3$ (ppm) | |
|---|---|---|
| | No Additive | $NaAlO_2$ Additive |
| 0.25 | 1520 | 1500 |
| 0.50 | — | 150 |
| 0.75 | — | 140 |
| 1.00 | 1190 | 150 |
| 1.50 | — | 150 |
| 2.00 | 990 | 140 |
| 3.00 | 670 | 100 |
| 4.00 | 440 | — |
| 5.00 | 320 | — |
| 6.00 | 340 | — |

The effect of the sodium aluminate is quite striking. Within 15 minutes after the addition of the sodium aluminate, the soluble silicate content is reduced from 1500 to 150 ppm $SiO_2$ basis $Na_2CO_3$.

Aluminum Hydroxide

The ability of aluminum hydroxide to reduce the soluble silicate content is illustrated by the following example.

EXAMPLE 8

The experimental procedure is identical to that used in Example 1 with one exception. 1.44 Hours after the beginning of the run, 8.31 grams of reagent grade aluminum hydroxide is added to the liquor. The decarbonized trona is the same as that used in Example 1. The data shown in Table I can, therefore, be used to compare the effect of aluminum hydroxide addition with a case in which no addition is made. The results are tabulated in Table VIII.

Table VIII

DESILICATION WITH ALUMINUM HYDROXIDE

| Time (hrs) | Soluble Silicate as $SiO_2$ Basis $Na_2CO_3$ (ppm) | |
|---|---|---|
| | No Additive | $Al(OH)_3$ Additive |
| 0.25 | 1520 | — |
| 0.33 | — | 1460 |
| 0.65 | — | 1266 |
| 0.85 | — | 1130 |
| 1.00 | 1190 | — |
| 1.17 | — | 860 |
| 2.00 | 990 | — |
| 2.17 | — | 250 |
| 3.00 | 670 | — |
| 3.17 | — | 86 |
| 4.00 | 440 | — |
| 4.25 | — | 33 |
| 5.00 | 320 | — |
| 5.42 | — | 20 |
| 6.00 | 340 | — |
| 6.67 | — | 11 |

It is evident that the soluble silicate content is rapidly reduced after addition of the aluminum hydroxide.

Bauxite

Bauxite has been found effective in the desilication of decarbonized trona liquors. The composition of bauxite may vary since it is a naturally occurring mineral. The major components of a typical bauxite used in the following examples are given in Table IX.

The effect of bauxite addition on the concentration of soluble silicate is demonstrated in Example 9.

Table IX

COMPOSITION OF BAUXITE

| | % By WEIGHT |
|---|---|
| $Al_2O_3$ | 66.2 |
| $SiO_2$ | 4.2 |
| $Fe_2O_3$ | 0.9 |
| $TiO_2$ | 2.3 |

EXAMPLE 9

The experimental procedure is identical to that in Example 1. The trona was decarbonized at a high temperature and, therefore, the initial concentration of soluble silicate in solution is quite high. Two digestions were carried out. In the first, no bauxite was added. In the second, 4 grams of bauxite is added after the 0.25 hour sample is extracted. The results are tabulated in Table X.

Table X

DESILICATION BY BAUXITE

| Time(hrs) | Soluble Silicate as $SiO_2$ Basis $Na_2CO_3$ (ppm) | |
|---|---|---|
| | No Addition | Bauxite Addition |
| 0.25 | 3150 | 3100 |
| 0.50 | 3350 | 2700 |
| 1.00 | 3600 | 2300 |
| 2.00 | 3400 | 1700 |
| 3.00 | 2950 | 1400 |
| 4.00 | 2700 | 1050 |
| 5.00 | 2400 | 930 |
| 6.00 | 2200 | 790 |

The data shown in Table X clearly demonstrates the ability of bauxite to remove soluble silicate from solution. It also shows the importance of the treatment when high decarbonizing temperatures are used.

The ability of bauxite to remove soluble silicates is not limited to liquors prepared from trona decarbonized at high temperatures as illustrated in the following example:

EXAMPLE 10

The experimental procedure is the same as that used in Example 1. The decarbonization temperature is 170°C. (338°F.). 735 Grams of the decarbonized trona is dissolved in 1500 grams of water. In the first digestion, no bauxite is added. In the second, 4 grams of bauxite is added after the 0.25 hour sample is extracted. The results are tabulated in Table XI.

Table XI

DESILICATION OF LOW TEMPERATURE DECARBONIZED TRONA LIQUOR WITH BAUXITE

| Time(hrs) | Soluble Silicate as SiO$_2$ Basis Na$_2$CO$_3$ (ppm) | |
|---|---|---|
| | No Additive | Bauxite Added |
| 0.25 | 740 | 750 |
| 0.50 | 640 | 350 |
| 1.00 | 640 | 230 |
| 2.00 | 620 | 170 |
| 3.00 | — | 110 |
| 4.00 | 500 | 75 |
| 5.00 | 410 | 60 |
| 6.00 | 360 | 46 |

The data presented demonstrates that desilication with bauxite is effective even at the relatively low concentrations of soluble silicate prevailing in solutions prepared from trona which has been decarbonized at a low temperature.

Magnesium Oxide

Magnesium oxide has been found effective in removing soluble silicates from solutions of decarbonized trona. The following example illustrates the effect.

EXAMPLE 11

The procedure used is identical to that of Example 1, except that two digestions are performed. In the first, no magnesium oxide is added. In the second, 3.0 grams of magnesium oxide are added. The results are shown in Table XII.

The magnesium oxide is clearly effective as is demonstrated by the data presented.

Table XII

DESILICATION OF DECARBONIZED TRONA LIQUOR WITH MAGNESIUM OXIDE

| Time (hrs) | Soluble Silicate as SiO$_2$ Basis Na$_2$CO$_3$ (ppm) | |
|---|---|---|
| | No Additive | MgO Added |
| 0.25 | 3150 | 2900 |
| 0.50 | 3350 | 2750 |
| 1.00 | 3600 | 2700 |
| 2.00 | 3400 | 2400 |
| 3.00 | 2950 | 2050 |
| 4.00 | 2700 | 1800 |
| 5.00 | 2400 | 1500 |

The method used throughout for determining soluble silicates is given below:

The soluble silicate is determined colorimetrically by comparison with the color produced by similarly treated prepared standards. This is accomplished by the reaction of the silicate with ammonium molybdate, producing a yellow colored complex, then by reduction with 1-amino-2-naphthol-4-sulfamic acid to produce the blue complex. Comparisons are made photometrically at 620 millimicrons, using a Technicon Autoanalyzer, manufactured by the Technicon Instrument Corp. of Chauncy, New York.

Various modifications and alterations will become apparent to those skilled in the art, without departing from the scope and spirit of the invention, and it should be understood that the latter is not limited to the aforementioned examples and discussion.

We claim:

1. A method of reducing soluble silicates from an aqueous sodium carbonate solution prepared from calcined trona having at least about 20 percent by weight sodium carbonate dissolved therein, and containing as impurities, soluble silicates and suspended insoluble matter, which method comprises the steps of: digesting the aqueous sodium carbonate solution in the absence of additives to insolubilize the silicates at a temperature within the range of 160° and 240°F. for a time sufficient to remove at least 25 percent of the soluble silicates contained therein; and separating the digested solution from contained insoluble matter.

2. The method of claim 1 wherein the aqueous solution has a sodium carbonate concentration of between 20 and 35.5 percent sodium carbonate.

3. The method of claim 1 wherein the aqueous solution is substantially saturated with respect to sodium carbonate.

4. The method of claim 1 wherein the digestion is carried out at a temperature within the range of 185° to 210°F.

5. The method of claim 1 wherein the digestion is carried out for between ½ and 8.0 hours.

6. The process of claim 1 wherein the trona is calcined at temperatures of about 500°C.

7. The method of claim 1 wherein sodium carbonate is obtained by crystallizing said sodium carbonate from the solution separated from the contained insoluble matter under crystallization conditions sufficient to effect formation of a stable crystal phase of said sodium carbonate.

8. The method of claim 7 wherein the crystalline sodium carbonate is sodium carbonate monohydrate.

9. The method of claim 7 wherein the sodium carbonate crystals are separated from the concentrated solution and dried and the concentrated solution free of crystals is recovered as mother liquor.

10. The method of claim 9 wherein the aqueous sodium carbonate solution comprises a solution of trona in an aqueous medium consisting, at least in part, of the mother liquor from the crystallization step.

11. The method of claim 9 wherein the mother liquor separated from the sodium carbonate crystals is recycled to the aqueous sodium carbonate solution prior to its digestion.

* * * * *